(12) United States Patent
Hsieh

(10) Patent No.: US 8,283,937 B2
(45) Date of Patent: Oct. 9, 2012

(54) MONITORING SYSTEM AND INPUT AND OUTPUT DEVICE

(75) Inventor: Ming-Chih Hsieh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 407 days.

(21) Appl. No.: 12/770,779

(22) Filed: Apr. 30, 2010

(65) Prior Publication Data

US 2011/0148565 A1   Jun. 23, 2011

(51) Int. Cl.
*G01R 27/00* (2006.01)
*G05B 23/02* (2006.01)
(52) U.S. Cl. .......................... 324/713; 340/3.1
(58) Field of Classification Search .................. 324/713, 324/73.1, 158.1; 340/3.1, 3.43, 3.44, 3.5
See application file for complete search history.

(56) References Cited

U.S. PATENT DOCUMENTS 4,988,988 A * 1/1991 Kimura ..................... 340/3.44
5,512,890 A * 4/1996 Everson et al. .......... 340/870.13

* cited by examiner

*Primary Examiner* — Vincent Q Nguyen
(74) *Attorney, Agent, or Firm* — Altis Law Group, Inc.

(57) ABSTRACT

A monitoring system includes a controller, a number of sensors, a number of alarms, and a number of input/output devices. Each input/output device is connected between the controller and a sensor or an alarm. Each input/output device includes an input circuit, an output circuit, and a connector to selectively connect to the sensor or the alarm. The input circuit and the output circuit are connected between the controller and the connector. The controller controls status of the input circuit and the output circuit. When the connector is connected to the alarm, the controller controls the alarm to work via the output circuit. When the connector is connected to the sensor, the sensor outputs a detection signal to the controller via the input circuit.

12 Claims, 4 Drawing Sheets

MONITORING SYSTEM AND INPUT AND OUTPUT DEVICE

CROSS-REFERENCE

Relevant subject matter is disclosed in one co-pending U.S. patent application Ser. No. 12/641,230, which is assigned to the same assignee as this patent application.

BACKGROUND

1. Technical Field

The present disclosure relates to monitoring systems and, particularly, to a monitoring system with input and output devices.

2. Description of Related Art

In a monitoring or alarm system, input devices input detection signals from sensors to a controller, and output devices output motion signals from the controller to alarms. Generally, the input devices and output devices are integrated into the monitoring system and the number of input and output devices is fixed. As a result, it is inconvenient to modify such a monitoring system to extend its input and output capability.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
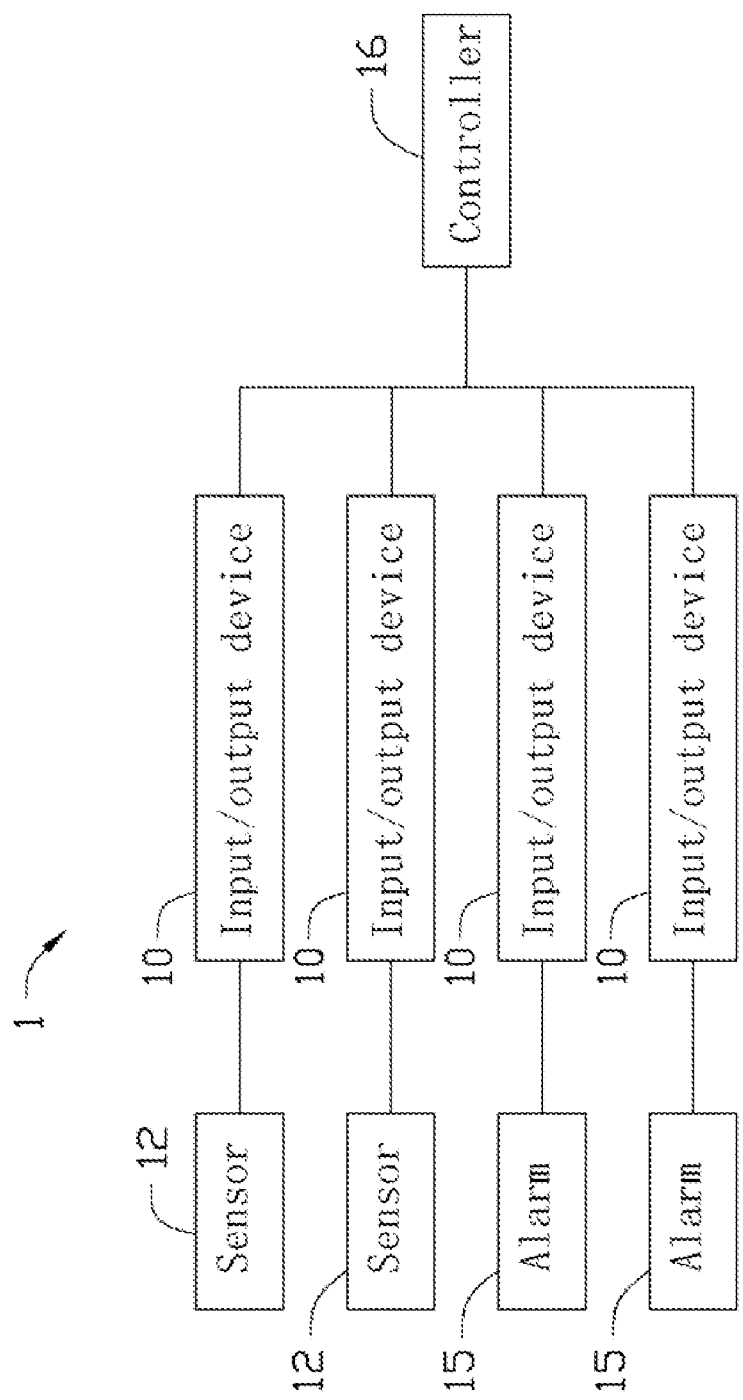
FIG. 1 is a schematic block diagram of an exemplary embodiment of a monitoring system, the monitoring system including input and output devices.

Referring to FIG. 1, an exemplary embodiment of a monitoring system 1 includes a plurality of input and output (input/output) devices 10, a plurality of sensors 12, a plurality of alarms 15, and a controller 16. A sum of the plurality of sensors 12 and the plurality of alarms 15 equals to the number of the plurality of input/output devices 10.

A first terminal of each input/output device 10 is connected to one of the plurality of sensors 12, or one of the plurality of alarms 15. Second terminals of the plurality of input/output devices 10 are connected to the controller 16. In the embodiment, the plurality of sensors 12 are temperature sensors.

When an input/output device 10 functions as an input device, the input/output device 10 transmits a detection signal from the sensor 12 to the controller 16. When an input/output device 10 functions as an output device, the input/output device 10 transmits a motion signal from the controller 16 to the alarm 15.

Figure 2:
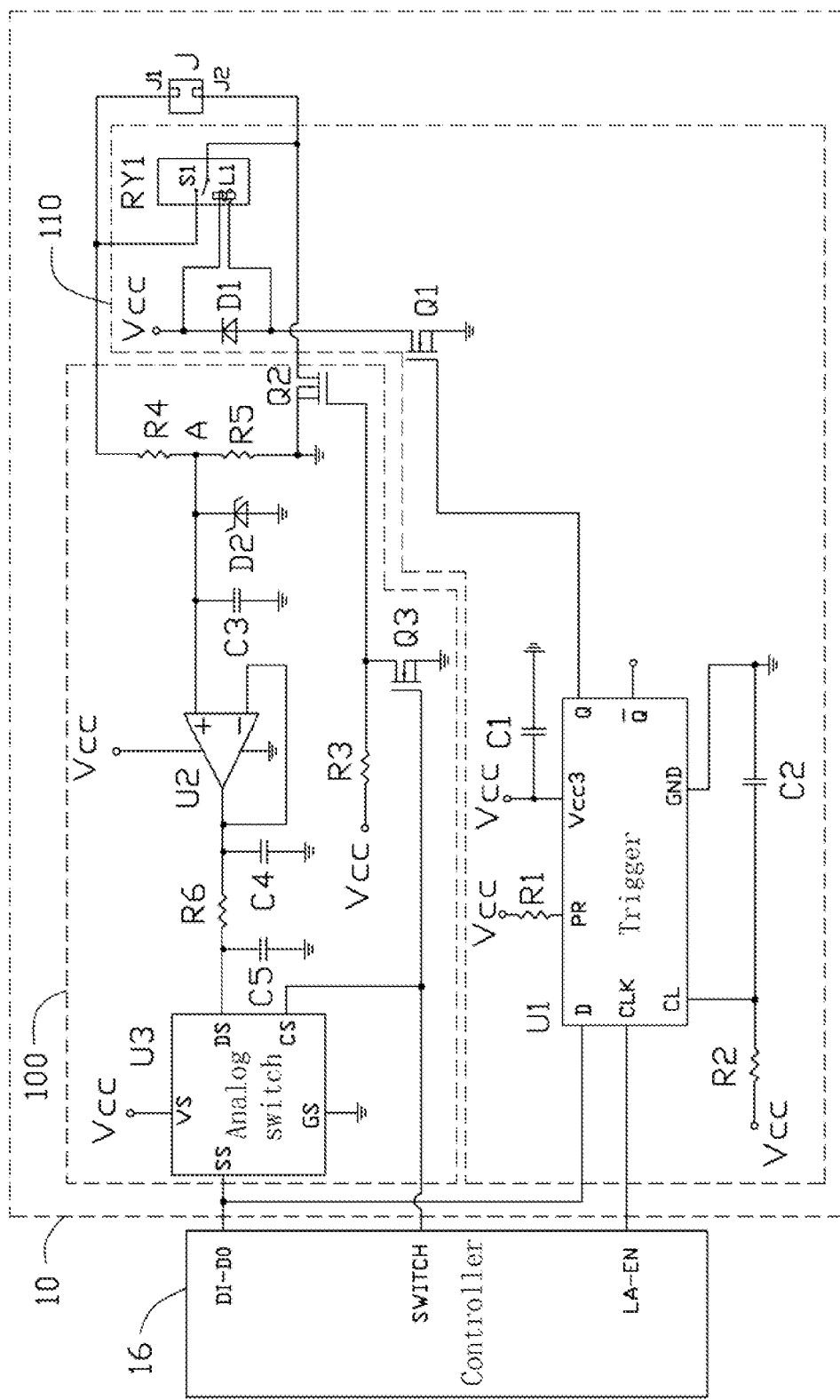
FIG. 2 is a circuit diagram of one of the input and output devices in FIG. 1.

Referring to FIG. 2, the input/output device 10 includes an input circuit 100, an output circuit 110, and a connector J. The input circuit 100 is connected between the controller 16 and the connector J. The output circuit 110 is connected between the controller 16 and the connector J.

The controller 16 controls status of the input circuit 100 and the output circuit 110. When the input/output device 10 is connected to an alarm 15, the controller 16 outputs a motion signal to the alarm 15 via the output circuit 110. When the input/output device 10 is connected to a sensor 12, the sensor 12 outputs a detection signal to the controller 16 via the input circuit 100.

The controller 16 includes a plurality of input/output terminals DI-DO, a plurality of trigger terminals LA-EN, and a plurality of control terminals SWITCH.

The output circuit 110 includes a metal-oxide-semiconductor field effect transistor (MOSFET) Q1, a diode D1, a trigger U1, a relay RY1, resistors R1 and R2, and capacitors C1 and C2. The MOSFET Q1 is an n-channel MOSFET.

The relay RY1 includes a coil L1 and a switch S1. A first terminal of the coil L1 is connected to a power source Vcc. A second terminal of the coil L1 is connected to an anode of the diode D1. A cathode of the diode D1 is connected to the power source Vcc. The second terminal of the coil L1 is also connected to a drain of the MOSFET Q1. A first terminal of the switch S1 is connected to a first terminal J1 of the connector J. A second terminal of the switch S1 is connected to a second terminal J2 of the connector J. A source of the MOSFET Q1 is grounded. A gate of the MOSFET Q1 is connected to a positive terminal Q of the trigger U1.

A motion terminal D of the trigger U1 is connected to an input/output terminal DI-DO of the controller 16. A clock terminal CLK of the trigger U1 is connected to a trigger terminal LA-EN of the controller 16. A control terminal PR of the trigger U1 is connected to the power source Vcc via the resistor R1. A power terminal Vcc3 of the trigger U1 is connected to the power source Vcc, and is grounded via the capacitor C1. A negative terminal $\overline{Q}$ of the trigger U1 is idle. A reset terminal CL of the trigger U1 is connected to the power source Vcc via the resistor R2, and is grounded via the capacitor C2. A ground terminal GND of the trigger U1 is grounded. In the embodiment, the trigger U1 is a D type trigger.

The input circuit 100 includes MOSFETs Q2 and Q3, a voltage stabilizing diode D2, an operational amplifier U2, an analog switch U3, resistors R3~R6, and capacitors C3~C5. The MOSFETs Q2 and Q3 are n-channel MOSFETs.

A drain of the MOSFET Q2 is connected to the second terminal J2 of the connector J. A source of the MOSFET Q2 is grounded. A drain of the MOSFET Q3 is connected to a gate of the MOSFET Q2, and connected to the power source Vcc via the resistor R3. A gate of the MOSFET Q3 is connected to a control terminal SWITCH of the controller 16. A source of the MOSFET Q3 is grounded.

A first terminal of the resistor R4 is connected to the first terminal J1 of the connector J. A second terminal of the resistor R4 is grounded via the resistor R5. A cathode of the voltage stabilizing diode D2 is connected to a node A between the resistors R4 and R5. An anode of the voltage stabilizing diode D2 is grounded.

A non-inverting input of the operational amplifier U2 is connected to the cathode of the voltage stabilizing diode D2, and is grounded via the capacitor C3. An inverting input of the operational amplifier U2 is connected to an output of the operational amplifier U2. A power terminal of the operational amplifier U2 is connected to the power source Vcc. A ground terminal of the operational amplifier U2 is grounded. The output of the operational amplifier U2 is also grounded via the capacitor C4.

A first terminal of the resistor R6 is connected to the output of the operational amplifier U2. A second terminal of the resistor R6 is grounded via the capacitor C5. The resistor R6, the capacitors C4 and C5 compose a pi-type filter to filter high frequency signals of the output of the operational amplifier U2.

The analog switch U3 includes an input DS, an output SS, a control terminal CS, a power terminal VS, and a ground terminal GS. The input DS of the analog switch U3 is connected to the second terminal of the resistor R6. The output SS of the analog switch U3 is connected to the input/output terminal DI-DO of the controller 16. The control terminal CS of the analog switch U3 is connected to the control terminal SWITCH of the controller 16. The power terminal VS of the analog switch U3 is connected to the power source Vcc. The ground terminal GS of the analog switch U3 is grounded. When the control terminal CS is at a low level, such as 0.3 volts, the input DS is connected to the output SS of the analog switch U3. When the control terminal CS is at a high level, such as 3.3 volts, the input DS is disconnected from the output SS of the analog switch U3.

When the control terminal SWITCH of the controller 16 is at a high level, such as 3.3 volts, the connector J is electrically connected to the controller 16 via the output circuit 110. At this time, the input/output terminal DI-DO of the controller 16 functions as an output terminal, to output a motion signal to the alarm 15, which is connected to the connector J.

When the control terminal SWITCH of the controller 16 is at a low level, such as 0.3 volts, the connector J is electrically connected to the controller 16 via the input circuit 100. At this time, the input/output terminal DI-DO of the controller 16 functions as an input terminal, to receive a detection signal from the sensor 12, which is connected to the connector J.

Figure 3:
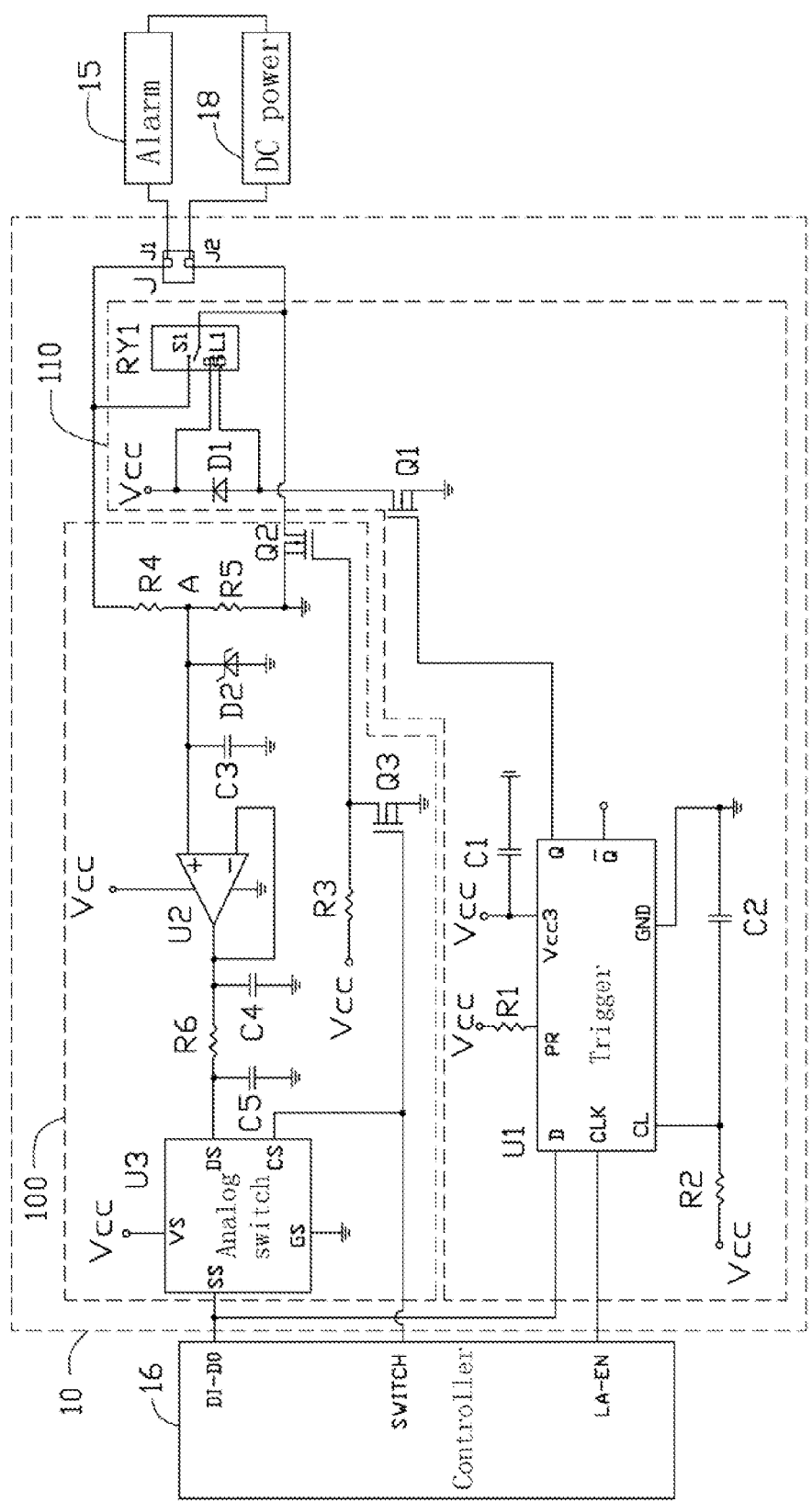
FIG. 3 is a schematic diagram of one of the input and output devices in FIG. 1, functioning as an output device.

Referring to FIG. 3, when the control terminal SWITCH of the controller 16 is at a high level, the input/output device 10 functions as an output device. At this time, the first terminal J1 of the connector J, the alarm 15, a direct current (DC) power 18, and the second terminal J2 of the connector J are connected in series.

The control terminal CS of the analog switch U3 is at a high level and the trigger terminal LA-EN of the controller 16 is at a rising edge. The input DS of the analog switch U3 is disconnected from the output SS of the analog switch U3. At the same time, the gate of the MOSFET Q3 is at a high level. The MOSFET Q3 turns on and the drain of the MOSFET Q3 is at a low level. The MOSFET Q2 turns off. The second terminal J2 of the connector J is not grounded and the input circuit 100 disconnects the connector J from the controller 16.

Upon the condition that the input/output terminal DI-DO of the controller 16 is at a high level and the trigger terminal LA-EN is at a rising edge, the motion terminal D of the trigger U1 is at a high level and the clock terminal CLK of the trigger U1 is at a rising edge. As a result, the positive terminal Q of the trigger U1 is at a high level. The MOSFET Q1 turns on. The relay RY1 is actuated. The switch S1 turns on. At this time, the alarm 15, the DC power 18, and the switch S1 form a closed loop and the alarm 15 works.

Upon the condition that the input/output terminal DI-DO of the controller 16 is at a low level and the trigger terminal LA-EN is at a rising edge, the motion terminal D of the trigger U1 is at a low level and the clock terminal CLK of the trigger U1 is at a rising edge. As a result, the positive terminal Q of the trigger U1 is at a low level. The MOSFET Q1 turns off. The relay RY1 is non-actuated. The switch S1 turns off. At this time, the alarm 15 is disconnected from the DC power 18. The alarm 15 stops working.

Figure 4:
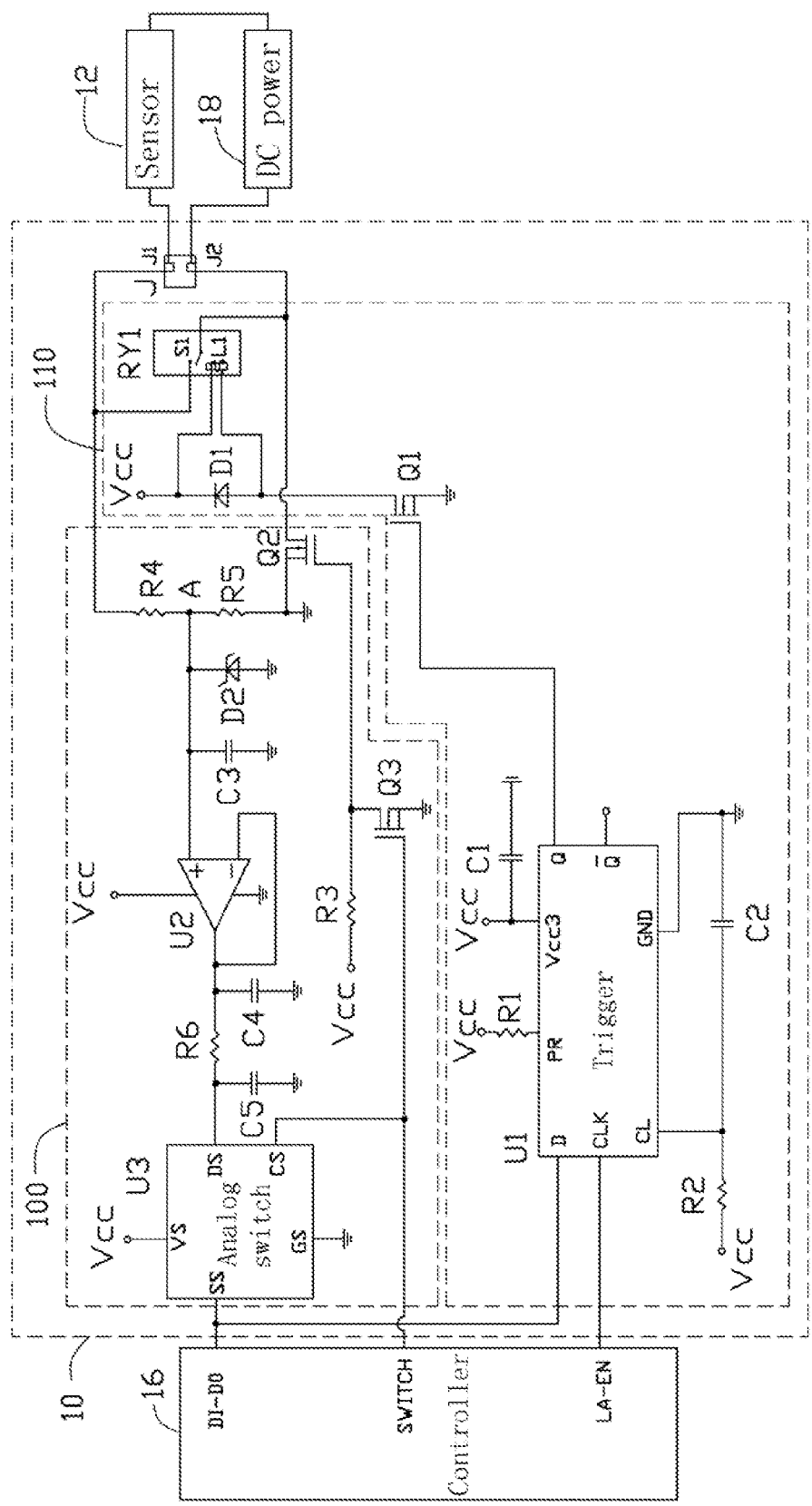
FIG. 4 is a schematic diagram of one of the input and output devices in FIG. 1, functioning as an input device.

Referring to FIG. 4, when the control terminal SWITCH of the controller 16 is at a low level, the input/output device 10 functions as an input device. At this time, the first terminal J1 of the connector J, the sensor 12, the DC power 18, and the second terminal J2 of the connector J are connected in series.

The control terminal CS of the analog switch U3 is at a low level. The input DS of the analog switch U3 is connected to the output SS of the analog switch U3. At the same time, the gate of the MOSFET Q3 is at a low level. The MOSFET Q3 turns off and the drain of the MOSFET Q3 is at a high level. The MOSFET Q2 turns on. The second terminal J2 of the connector J is grounded via the MOSFET Q2 and the input circuit 100 connects to the connector J and the controller 16. At the same time, the trigger terminal LA-EN of the controller 16 is not at a rising edge. As a result, the positive terminal Q of the trigger U1 does not output signals. The MOSFET Q1 turns off. The relay RY1 is non-actuated and the switch S1 turns off. The output circuit 110 stops working.

When the sensor 12 has detected a variety of temperatures, the voltage of a node between the resistor R4 and the first terminal J1 of the connector J changes correspondingly. The relationship of the voltage Vb of the node between the resistor R4 and the first terminal J1 of the connector J, the voltage Va of the node A, resistances of the resistors R4 and R5 is shown as below.

$$Va=Vb\times R5/(R4+R5)$$

The input/output terminal DI-DO of the controller 16 receives the voltage signal of the node A via the analog switch U3, the resistor R6, and the operational amplifier U2. The controller 16 determines temperature according to the voltage signal of the node A.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A monitoring system, comprising:
   a controller comprising a plurality of input and output (input/output) terminals and a plurality of control terminals;
   a plurality of sensors each to send out a detection signal detected by the sensor;
   a plurality of alarms; and
   a plurality of input/output devices, wherein a sum of the plurality of sensors and the plurality of alarms equals to a number of the plurality of input/output terminals of the controller, each input/output terminal of the controller is connected to one of the plurality of sensors or one of the plurality of alarms via an input/output device, each input/output device comprises an input circuit, an output circuit, and a connector comprising a first terminal and a second terminal, the output circuit is connected between the controller and the connector, the input circuit comprises a first metal-oxide-semiconductor field effect transistor (MOSFET), a second MOSFET, a voltage stabilizing diode, an operational amplifier, and an analog switch, a drain of the first MOSFET is connected to the second terminal of the connector, a source of the first MOSFET is grounded, a drain of the second MOSFET is connected to a gate of the first MOSFET and connected to a power source via a first resistor, a gate of the second MOSFET is connected to a corresponding control terminal of the controller, a source of the second MOSFET is grounded, a cathode of the voltage stabilizing diode is connected to the first terminal of connector via a second resistor and connected to the source of the first MOSFET via a third resistor, an anode of the voltage stabilizing diode is grounded, a non-inverting input of the operational amplifier is connected to the cathode of the voltage stabilizing diode, an inverting input of the operational amplifier is connected to an output of the operational amplifier, the output of the operational amplifier is connected to an input of the analog switch via a fourth resistor, an output of the analog switch is connected to a corresponding input/output terminal of the controller, a control terminal of the analog switch is connected to the control terminal of the controller;

wherein the controller controls status of the input circuit and the output circuit, if the input/output device is connected to one of the plurality of alarms via the connector, the controller controls the alarm to work via the output circuit, if the input/output device is connected to one of the plurality of sensors via the connector, the sensor outputs a detection signal to the controller via the input circuit.

2. The monitoring system of claim 1, wherein the controller further comprises a plurality of trigger terminals, the output circuit of each input/output device comprises a third MOSFET, a diode, a trigger, and a relay, the relay comprises a coil and a switch, a first terminal of the coil is connected to the power source, a second terminal of the coil is connected to an anode of the diode, a cathode of the diode is connected to the power source, the second terminal of the coil is also connected to a drain of the third MOSFET, a first terminal of the switch is connected to the first terminal of the connector, a second terminal of the switch is connected to the second terminal of the connector, a source of the third MOSFET is grounded, a gate of the third MOSFET is connected to a positive terminal of the trigger, a motion terminal of the trigger is connected to a corresponding input/output terminal of the controller, a clock terminal of the trigger is connected to a trigger terminal of the controller, a control terminal of the trigger is connected to the power source via a fifth resistor, a power terminal of the trigger is connected to the power source, a negative terminal of the trigger is idle, a reset terminal of the trigger is connected to the power source via a sixth resistor, a ground terminal of the trigger is grounded.

3. The monitoring system of claim 2, wherein the first, the second, and the third MOSFETs are n-channel MOSFETs.

4. The monitoring system of claim 2, wherein the trigger is a D type trigger.

5. The monitoring system of claim 1, wherein the input of the analog switch is also grounded via a capacitor.

6. The monitoring system of claim 1, wherein the output of the operational amplifier is also grounded via a capacitor.

7. An input and output device, comprising:
a connector comprising a first terminal selectively connected to a sensor or an alarm, and a second terminal connected to the sensor or alarm via a first power source;
an output circuit connected between a controller and the connector, wherein if the connector is connected to the alarm, the controller controls the alarm to work; and
an input circuit connected between the controller and the connector, wherein the input circuit comprises a first metal-oxide-semiconductor field effect transistor (MOSFET), a second MOSFET, a voltage stabilizing diode, an operational amplifier, and an analog switch, wherein a drain of the first MOSFET is connected to the second terminal of connector, a source of the first MOSFET is grounded, a drain of the second MOSFET is connected to a gate of the first MOSFET and connected to a second power source a first resistor, a gate of the second MOSFET is connected to a control terminal of the controller, a source of the second MOSFET is grounded, a cathode of the voltage stabilizing diode is connected to the first terminal of connector via a second resistor and connected to the source of the first MOSFET, an anode of the voltage stabilizing diode is grounded, a non-inverting input of the operational amplifier is connected to the cathode of the voltage stabilizing diode, an inverting input of the operational amplifier is connected to an output of the operational amplifier, the output of the operational amplifier is connected to an input of the analog switch via a third resistor, an output of the analog switch is connected to an input and output terminal of the controller, a control terminal of the analog switch is connected to the control terminal of the controller, if the connector is connected to the sensor, the sensor transmits signals sensed by the sensor to the controller.

8. The input and output device of claim 7, wherein the output circuit comprises a third MOSFET, a diode, a trigger, and a relay, the relay comprises a coil and a switch, a first terminal of the coil is connected to the second power source, a second terminal of the coil is connected to an anode of the diode, a cathode of the diode is connected to the second power source, the second terminal of the coil is also connected to a drain of the third MOSFET, a first terminal of the switch is connected to the first terminal of the connector, a second terminal of the switch is connected to the second terminal of the connector, a source of the third MOSFET is grounded, a gate of the third MOSFET is connected to a positive terminal of the trigger, a motion terminal of the trigger is connected to a corresponding input/output terminal of the controller, a clock terminal of the trigger is connected to a trigger terminal of the controller, a control terminal of the trigger is connected to the power source via a fifth resistor, a power terminal of the trigger is connected to the power source, a negative terminal of the trigger is idle, a reset terminal of the trigger is connected to the power source via a sixth resistor, a ground terminal of the trigger is grounded.

9. The input and output device of claim 8, wherein the trigger is a D type trigger.

10. The input and output device of claim 8, wherein the first, the second, and the third MOSFETs are n-channel MOSFETs.

11. The input and output device of claim 7, wherein the input of the analog switch is also grounded via a capacitor.

12. The input and output device of claim 7, wherein the output of the operational amplifier is also grounded via a capacitor.

* * * * *

UNITED STATES PATENT AND TRADEMARK OFFICE
CERTIFICATE OF CORRECTION

PATENT NO. : 8,283,937 B2  
APPLICATION NO. : 12/770779  
DATED : October 9, 2012  
INVENTOR(S) : Ming-Chih Hsieh Page 1 of 1

It is certified that error appears in the above-identified patent and that said Letters Patent is hereby corrected as shown below:

Title Page, below Item (65) insert:

-- (30)     Foreign Application Priority Data

Dec. 17, 2009   (CN) ...........................200910311643.7 --

Signed and Sealed this  
Eighth Day of April, 2014

Michelle K. Lee  
*Deputy Director of the United States Patent and Trademark Office*